United States Patent [19]

Pasko

[11] 4,444,474
[45] Apr. 24, 1984

[54] STATIONARY EYEPIECE TELESCOPE

[76] Inventor: Edward H. Pasko, 307 E. Tunnell St., Santa Maria, Calif. 93454

[21] Appl. No.: 342,516

[22] Filed: Jan. 25, 1982

[51] Int. Cl.³ .................. G02B 17/06; G02B 23/06
[52] U.S. Cl. .................................. 350/503; 350/445
[58] Field of Search .............................. 350/503–505, 350/539, 541, 557–558, 567–569, 442–443, 445, 571

[56] References Cited

U.S. PATENT DOCUMENTS

| 471,708 | 3/1892 | Rudall | 350/503 |
| 2,504,384 | 4/1950 | Bouwers | 350/445 |
| 3,881,749 | 5/1974 | Abel | 350/504 |
| 3,951,511 | 4/1976 | Parsons | 350/568 |
| 4,101,195 | 7/1978 | Korsch | 350/505 |

OTHER PUBLICATIONS

Berry, R. "Newtonian Telescopes", Telescope Making, vol. 9, Fall 1980, pp. 6–13.

Primary Examiner—William H. Punter
Attorney, Agent, or Firm—Norman B. Rainer

[57] ABSTRACT

A telescope is provided having a cylindrical main housing, one end of which is closed, and the opposite end having a viewing lens system moveable along the axis of the main housing. A cylindrical turret is mounted above the main housing in communication therewith and adapted to revolve 360° about its cylindrical axis which perpendicularly intersects the axis of the main housing. A pedestal mount having position-controlling and stabilizing means is associated with the main housing.

A light-receiving aperture is located in the sidewall of the turret. Light which enters the aperture is downwardly reflected by a first flat mirror of elliptical periphery to impingement upon a second flat mirror of elliptical periphery containing a centered aperture of elliptical shape. Light leaving the second flat mirror strikes a concave mirror adjacent the closed end of the main housing, and is reflected in focused form through the elliptical aperture in the second flat mirror and then to the viewing lens system.

5 Claims, 3 Drawing Figures

STATIONARY EYEPIECE TELESCOPE

BACKGROUND OF THE INVENTION

This invention relates to improvements in telescopes, and is more particularly concerned with a pedestal-mounted reflecting-type telescope suitable for terrestrial and celestial use.

In the case of most conventional telescopes intended for celestial use, the user is caused to assume an uncomfortably awkward position because of the inconvenient location of the eyepiece or viewing lens and the fact that the position of said lens changes in the course of tracking movement of the telescope. In those instances where the viewing lens is mounted to that extremity of the telescope which is uppermost or lowermost during use, the telescope is generally of considerable length, causing problems in storage and utilization.

It is accordingly an object of the present invention to provide a telescope which does not require the user to assume an uncomfortably awkward viewing position.

It is a further object to provide a telescope of the aforesaid nature requiring less storage and operating space.

It is a still further object of this invention to provide a highly stable telescope of the aforesaid nature which enables the user to observe celestial or terrestial objects from the same stationary position in comfort.

These objects and other objects and advantages of the invention will be apparent from the following description.

SUMMARY OF THE INVENTION

The above and other beneficial objects and advantages are accomplished in accordance with the present invention by an improved telescope which comprises a cylindrical main housing, the first extremity of which is substantially closed, and the opposed, viewing extremity of which is provided with closure means having a circular aperture centered on the longitudinal axis of said housing and perpendicular thereto. A narrow cylindrical barrel equipped with a viewing lens system insertively engages said centered aperture in coaxial alignment with said main housing and slideably adjustable with respect thereto. A cylindrical turret having a substantially closed first extremity is rotatively mounted at its opposed open extremity to said main housing in a manner such that the cylindrical axis of said turret is its axis of rotation and perpendicularly intersects the longitudinal axis of the main housing.

The manner of mounting of said turret to said main housing is such that the turret is coincident with a matching opening in the sidewall of said main housing, thereby causing a continuous open passageway to extend between the interiors of said turret and main housing.

An entrance aperture is provided in the cylindrical sidewall of said turret. Positioned within the turret opposite said entrance aperture is a first flat mirror of elliptical periphery disposed at a 45° angle with respect to the axis of said turret and adapted to reflect light received from said entrance aperture into said main housing.

A second flat mirror of elliptical periphery and having an elliptical aperture centered therein is disposed within said main housing at a 45° angle with respect to the axes of both said main housing and turret and adapted to reflect light toward the first extremity of the main housing. The first and second flat mirrors are in parallel juxtaposition when the entrance aperture is directed toward the viewing extremity of said main housing. The elliptical aperture of said second flat mirror is oriented so that the major and minor axes of the aperture are coincident with the major and minor axes of the periphery of the mirror.

A concave primary mirror of round periphery is mounted within said housing adjacent said first extremity and perpendicularly centered on the longitudinal axis of the housing. The concave mirror is adapted to reflect focused light through the elliptical aperture toward said viewing lens system.

The main housing may be supported by pedestal means permitting rotative movement of the telescope about the axis of said main housing, said axis being the polar axis of the telescope.

During optical operation, parallel rays of light from a distant object enter said entrance aperture, impinge upon said first flat mirror and are reflected to said second flat mirror which in turn reflects the light to said concave mirror. The light is reflected by the concave mirror in a focused manner, and passes through the centered aperture in said second mirror to said viewing lens system which creates an observable magnified image.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
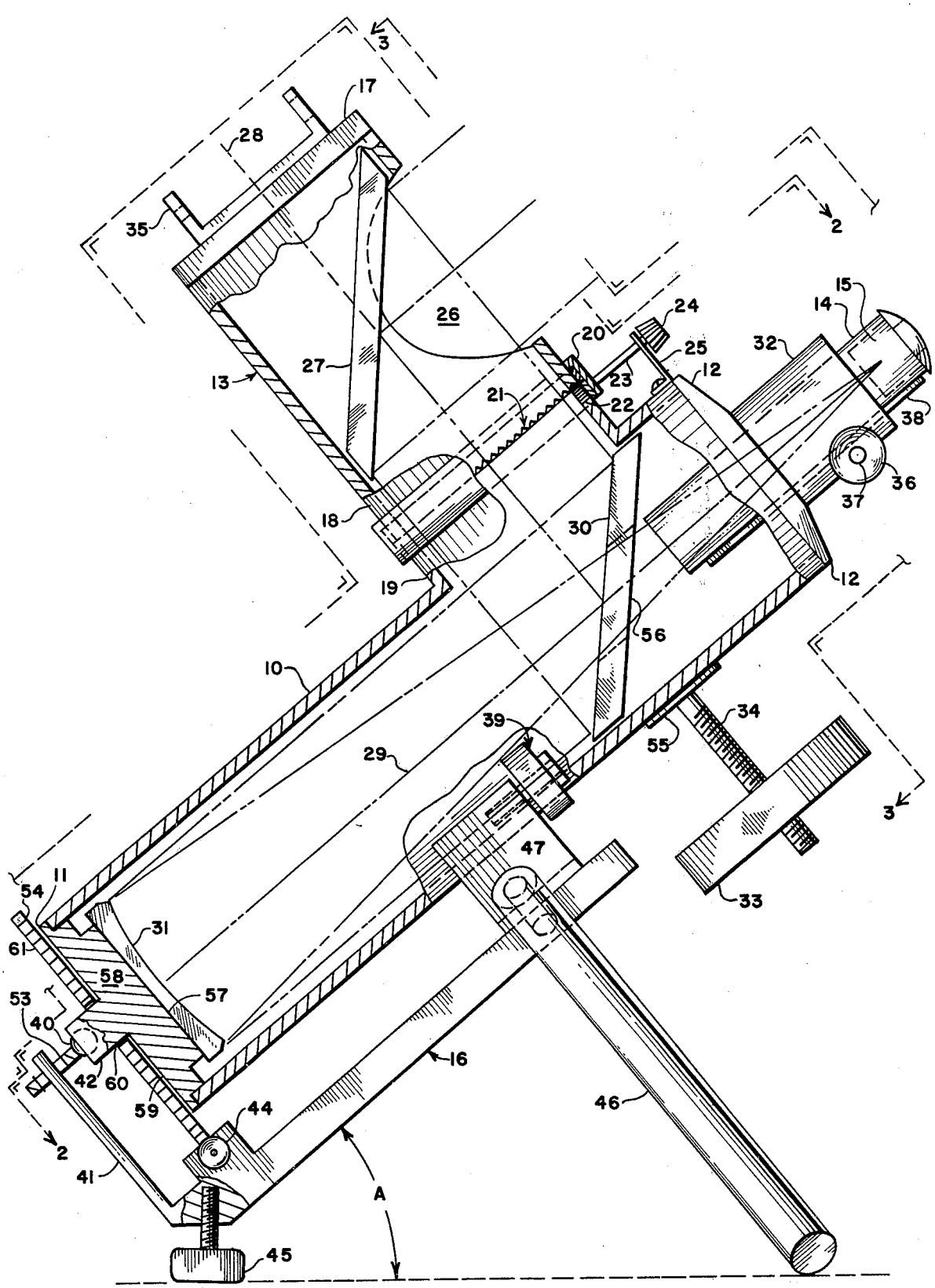
FIG. 1 is a sectional view of an embodiment of the telescope of the present invention with dotted lines indicative of the path of light through the telescope.

Referring to FIG. 1, a telescope is shown comprised of a generally cylindrical main housing 10 having a closed first end 11, and opposed viewing end 12. A generally cylindrical turret 13 communicates with said main housing adjacent viewing end 12. A narrow cylindrical barrel 14 containing eyepiece lens system 15, slideably engages apertured closure means 32 in the viewing end of said main housing. Adjustable pedestal means 16 supports the telescope by engagement with said main housing.

Turret 13 is comprised of an upper closed extremity 17 and an opposed, open extremity 18 which rotatively engages cylindrical port 19 in the upper sidewall portion of said main housing. Rotative attachment of said turret to port 19 is achieved by means of surrounding sleeve or band 20 which is attached to the outer surface of turret 13 and slideably engages port 19. A circle of horizontally disposed teeth 21 in band 20 is engaged by toothed wheel 22 attached by shaft 23 to knurled knob 24 mounted in bracket 25 attached to said main housing. Rotation of knob 24 causes rotative movement of the turret about port 19. The extent of said rotation may be 360° in either direction about center axis 28 of said turret which perpendicularly intersects longitudinal axis 29 of housing 10. Band 20 is further adapted to prevent passage of extraneous light into the telescope.

An entrance or light-admitting aperture 26 is cut into the sidewall of said turret. Positioned within the turret opposite aperture 26 is a first flat mirror 27 having an elliptical periphery. The size of the periphery of mirror 27 is such as to uniformly fit the inner wall of the turret while extending to the upper, lower and side extremities of aperture 26. Said first mirror is disposed at a 45° angle with respect to axis 28 and is adapted to reflect all the parallel light received from said entrance aperture into said main housing.

A second flat mirror 30 of elliptical periphery and having an elliptical aperture 56 centered therein is disposed within said main housing at a 45° angle with respect to both axes 28 and 29, and adapted to reflect light toward the first or closed extremity of the main housing.

A concave primary mirror 31 of round periphery is mounted within said housing adjacent the closed extremity thereof and perpendicularly centered on axis 29. Said mirror may be adhered to the inner flat surface 57 of closure means 58 in a manner such that the outer periphery of the mirror does not contact the inside wall of the main housing.

The concave mirror, the reflecting surface of which is preferably of parabolic configuration, is adapted to reflect focused light toward the viewing lens system. The focal length of the concave mirror is such as to cause the focal point to exist substantially at the eyepiece lens system 15.

A counterweight 33 may be threadably engaged with a threaded post 34 extending perpendicularly from attachment block 55 at the underside of housing 10 adjacent viewing end 12. The purpose of the counterweight is to balance the telescope with respect to pedestal means 16.

A peepsight or small finder scope 35 may be mounted atop turret 13 and aligned in the direction of the light which enters aperture 26.

Figure 2:
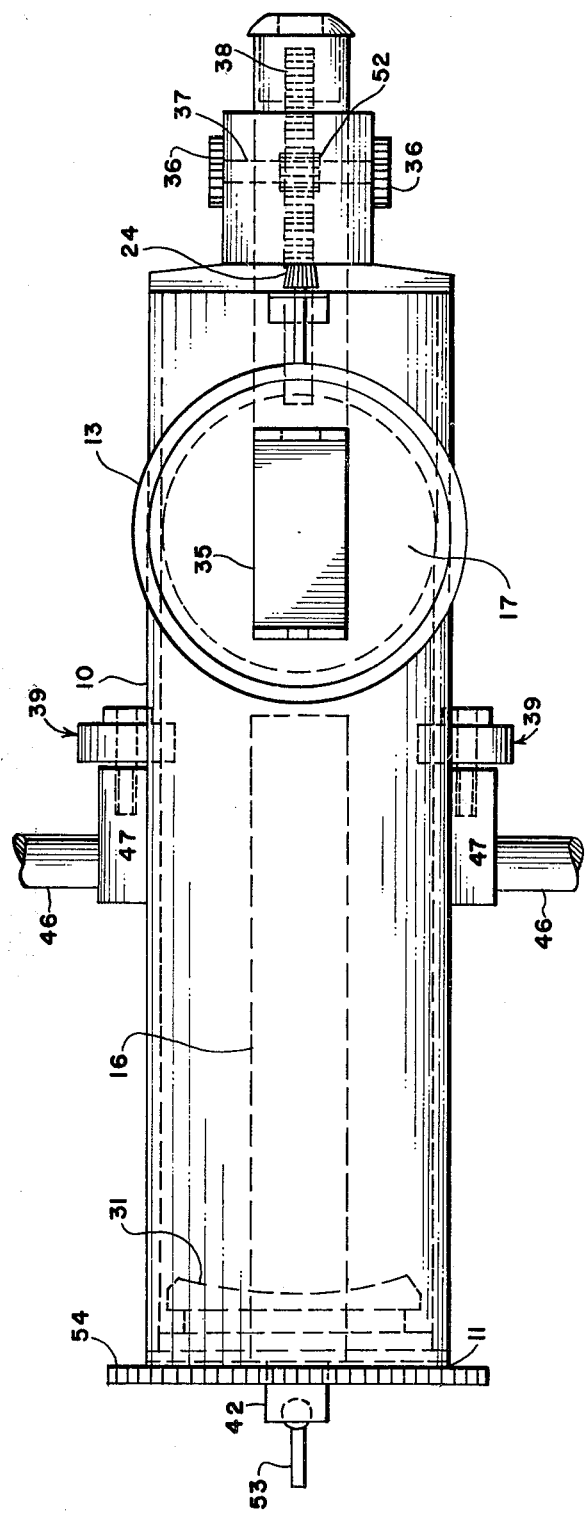
FIG. 2 is a top view of the embodiment of FIG. 1.

As shown most clearly in FIG. 2 barrel 14 is controllably moveable along axis 29 of said housing by a rack and pinion mechanism comprised of wheel 36 having attached thereto a centered shaft 37 rotatively supported by enclosure 32 and having a circular array of uniformly spaced teeth 52. A linear track of uniformly spaced teeth 38 affixed to the underside of said barrel engages said circular array of teeth 52.

Figure 3:
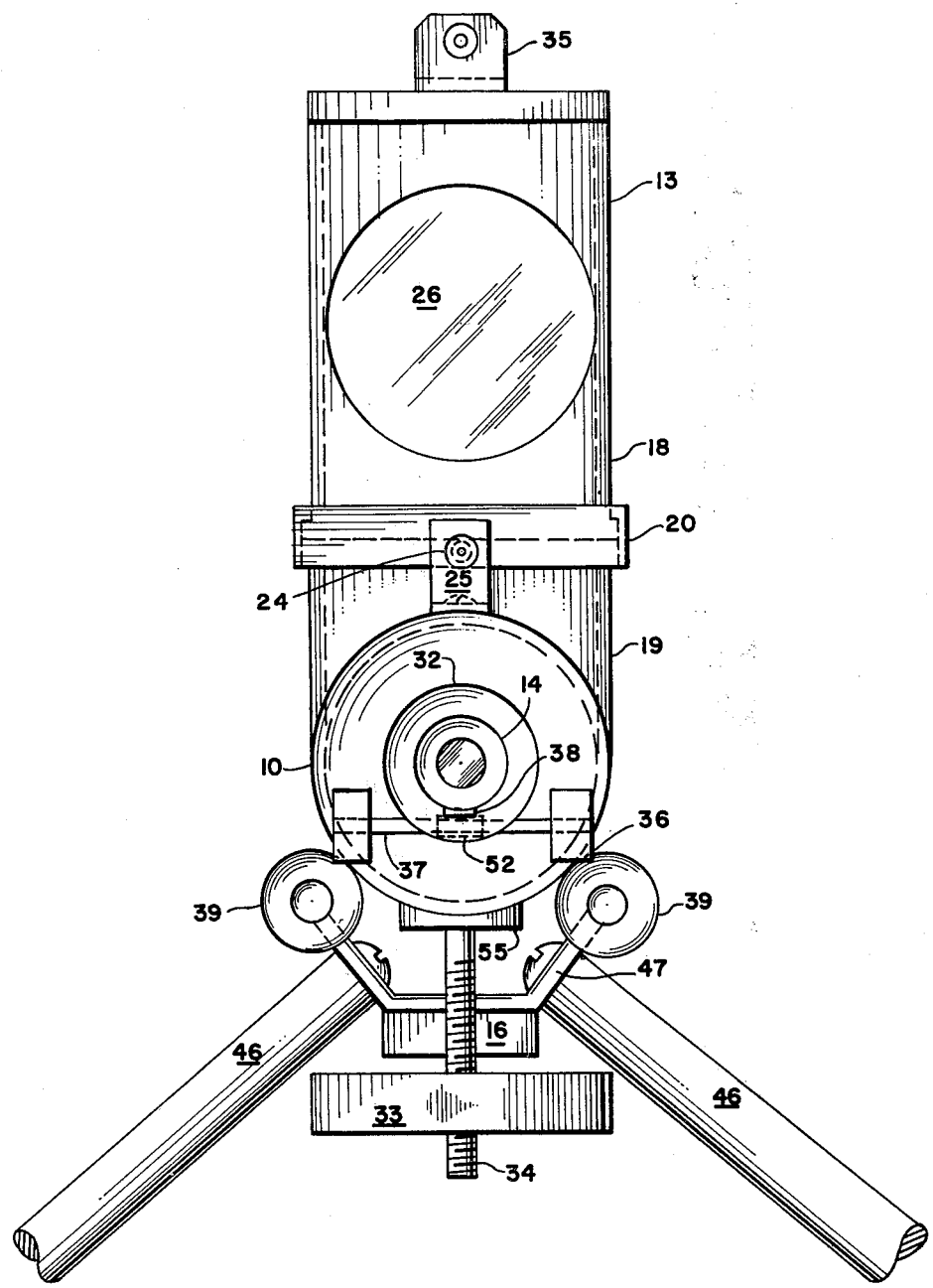
FIG. 3 is front end view of the embodiment of FIG. 1.

Pedestal means 16 is provided with a pair of opposed rollers 39 which engage the underside of said housing near the turret in a manner to permit rotative movement of the telescope about axis 29 of said housing. Said rollers are held by yoke 47 supported by tripod-type legs 46 shown in FIG. 3. To further assist in such rotative movement and to provide a stabilizing effect, a ball joint bearing 40 on threaded stem 53 supported by upright arm 41 engages ball housing 42 which is a centered integral extension of outside face 59 of end closure 58.

A flat tracking gear 54 of circular periphery and having a centered hole 60 is rotatively seated upon the cylindrical outer surface of housing 42 in sliding abutment with outer face 59 of end closure 58. The teeth 61 in the periphery of gear 54 engage worm gear 44. Tensioning or keying means (not shown) may act upon gear 54 from housing 42 or elsewhere to vary the axially directed force which presses gear 54 against outer face 59, whereby gear 54 is caused to function as a clutch which may or may not rotate the telescope about the axis of the main housing under the urging of worm gear 44. Said worm gear may be driven by a standard clock-driven motor as part of a tracking mechanism.

A support leg 45 is adjustably associated with the rearward extremity of pedestal means 16 and is adapted to cause the telescope to be angled within ±5 degrees of the celestial pole, as indicated by angle A of FIG. 1. The values of angle A may typically range between 30° and 40° above horizontal.

The turret and main housing may be fabricated of tubular aluminum or other suitable rigid tubular stock material. The several mirrors may be mounted within the telescope by either fixed or adjustable securing means. Rotation of the telescope in a horizontal plane may be achieved by well-known synchronous motors and associated tripod mechanisms generally used for clock-driven telescopes.

The following examples are given to further illustrate specific embodiments of the invention without limiting the invention thereto.

EXAMPLE 1

Primary Mirror: 4¼" (108 mm) diameter f/4 445 mm (17½") focal length, Flat to ⅛ wave parabolic, Annealed aluminized and overcoated Elliptical Mirrors: 4¼" (108 mm) minor axis 45° ellipse figured to (¼) wave, Annealed aluminized and overcoated Eyepiece: 12.5 mm Ramsdon, Standard, 1¼" coated Focuser: Rack and pinion, Standard, 1¼" ID focusing mount Main Housing: 5" OD×15"

Turret: 5" OD×8"

Mount: Equatorial pedestal mount when combined with telescope 0° to 90° latitude compatibility Clock Drive: Medium duty 115 V AC, 60 HZ Synchronous motor with ground plug, Brass main gear with steel worm gear and adjustable tension clutch

EXAMPLE 2

Primary Mirror: 3¾" f/12; 1060 mm f/1

Elliptical Mirrors: 3¾" minor axis 45° ellipse; aluminized and silicon monoxide coated figured to ¼ wave Eyepiece: 12.5 mm Ramsdon, Standard Focuser: Rack and pinion, Standard 1¼" ID focusing mount Main Housing: 4" OD×40"

Turret: 4" OD×7"

Mount: Equatorial with telescope, Elevation adjustment, hardwood frame, Ball bearings Clock Drive: Medium duty 115 V AC, 60 HZ, Synchronous motor with ground plug Brass main gear with steel worm gear and adjustable tension clutch In the embodiment of Example 1, the viewer is able to place the telescope on a table and view through the eyepiece while comfortably seated at said table. Sighting adjustments are easily made manually. Automatic tracking can be achieved by standard motorized means which may be associated with the pedestal. Regardless of the mode of sighting adjustment, the eyepiece remains in a fixed, readily accessible position before the seated viewer.

The embodiment of telescope of Example 2, being larger than the telescope of Example 1 because of the longer focal length of the concave mirror, is most conveniently allowed to stand on the floor or ground before the seated viewer.

This reflector telescope of this invention does not contain spider vanes which cause interference in astro photos. Counterbalance of camera and attachments is easily accomplished. No prism or star diagonal is required for ease of viewing through telescope or camera, the mounted telescope is not sensitive to light winds and the main housing becomes the polar axis when properly aligned with the celestial pole.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described the invention, what is claimed is:

1. A telescope comprising
   (a) a substantially cylindrical main housing, the first extremity of which is closed, and the opposed viewing extremity of which is provided with closure means having a circular aperture centered on the longitudinal axis of said main housing and perpendicular thereto,
   (b) a narrow cylindrical barrel equipped with a viewing lens system insertively engaged with said centered aperture in coaxial alignment with said main housing and slideably adjustable with respect thereto,
   (c) a cylindrical turret having a closed upper extremity rotatively mounted at its lower open extremity to said main housing in communication with the interior thereof, said mounting being such that said turret rotates about its cylindrical axis which perpendicularly intersects the axis of said main housing,
   (d) an entrance aperture positioned within the sidewall of said turret,
   (e) a first flat mirror of elliptical periphery disposed opposite said entrance aperture and at a 45° angle with respect to the cylindrical axis of said turret and adapted to reflect light received from said entrance aperture into said main housing,
   (f) a second flat mirror of elliptical periphery having an elliptical aperture centered therein in the same orientation as the elliptical periphery, said second flat mirror being disposed within said main housing at a 45° angle with respect to the axes of both said main housing and turret and adapted to reflect light toward the first extremity of said main housing,
   (g) a concave primary mirror of round periphery mounted within said main housing adjacent said first extremity and perpendicularly centered on the axis of said housing, said concave mirror being adapted to reflect focused light through said elliptical aperture and toward said viewing lens system, and
   (h) pedestal means associated with the main housing below said turret, said pedestal means serving to support the telescope and permit rotative movement about the axis of said main housing.

2. The telescope of claim 1 wherein said narrow cylindrical barrel is slideably adjustable with respect to said main housing by virtue of rack and pinion means.

3. The telescope of claim 1 wherein said turret is rotatively mounted to said main housing by means of a sleeve and associated circular array of gear teeth.

4. The telescope of claim 1 wherein said first and second flat mirrors have identical elliptical peripheries.

5. The telescope of claim 1 wherein said pedestal means is adapted to adjustably position the telescope such that the axis of the main housing is elevated to an angle of between 30° and 40° above horizontal.

* * * * *